No Printed Specification Available
9556X
J. Wilbur,
Wind Wheel.
Patented Mar. 30, 1836
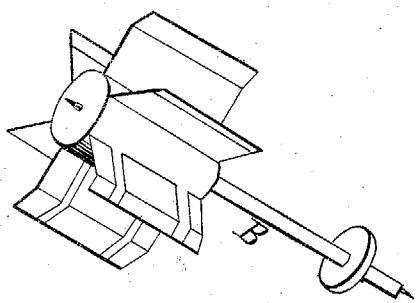
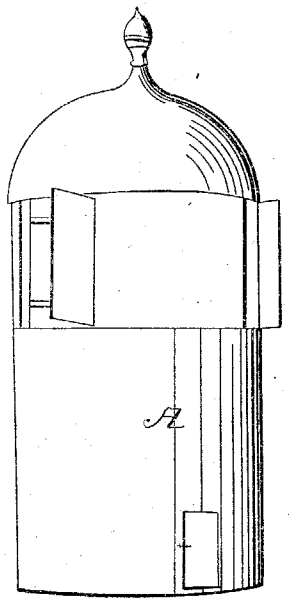
N. PETERS, PHOTO-LITHOGRAPHER, WASHINGTON, D. C.

9556X Mar 30 1836 Ar 14

Job Wilbur. of Fall river State of Massachusetts.

Letters Patent.

The schedule referred to in these Letters Patent and making part of the same containing a description in the words of the said Job Wilbur himself of his "Improvement in the Wind Mill."

To all to whom these presents shall come.

Be it known that I Job Wilbour of Fall River, in the County of Bristol and Commonwealth of Massachusetts, Yeoman, have invented a new and useful improvement in Wind Mills, or the application of Wind power. Called Wilbour's Patent Wind Mill, and that the following is a full and exact description of the construction and operation of the said machine as invented or improved by me.—

It consists of two general parts to wit the building and the machinery, and 1st the building is to be round, thirty feet in height, and twenty feet in diameter; and constructed in two parts. The first part is stationary, and is to be erected on a solid foundation, twenty feet high, having a strong plate at the top well studded. The second part of the building is ten feet in height from the top of the plate of the first parts, and is moveable; having a roof firmly framed or fastened to the top and jutting over about six inches; the base of the moveable part is fitted to move on a rail way, on the plate of the stationary part, and is moved to receive the wind, by means of a tackle and pulley, the block being hooked to the moveable part and moved from hook to hook, as occasion may require to bring the wheel properly to the wind. In the side of the moveable part is a window six feet wide and ten feet high, having a shutter fitted to the shape of the building, for the purpose of admitting the wind upon the wheel, having the shutter so fixed as to remain immoveable by the wind in any extent of opening desired. Opposite to this window, is a like window for the purpose of discharging the wind, the situation of these windows is such as that a line drawn from the inner edge of one to the other, parallel to one drawn through the centre of the building, would be four feet from the centre line. The second part of this invention, to wit: the machinery consists of a wheel and gearing. The wheel consists of a shaft, arms and floats or fans. The shaft is thirty feet long and eighteen inches in diameter of strong solid timber, at the upper end of the shaft, are inserted two setts of arms, each set having six arms, and placed equidistant in the shaft, the space between the two setts being six feet, Each of these arms is angular extending about two feet from the centre of the shaft, the point of the angle being about two feet and half from the outer extremity of the arm with an opening of about one hundred and fifteen degrees, being so formed for the better receiving and discharging the wind, on these arms are nailed thin strong boards to form the floats, or fans, and so finished as that each one shall be ten feet by six feet on the outer extremities of the arms. This wheel thus finished, having in the lower end of the shaft a pivot, and in the upper end an arbor moves on a plate of steel fixed in the centre sill of the stationary part of the building, in the centre of the building - and at the top in a quagson in a beam in the centre of the moveable part of the building. On the lower part of the shaft is fixed the gearing in the usual way of operation, either to grind corn or for other purposes. —— On the shaft in the inner edge of the float, is fastened thin boards, forming a kind of drum, for the purpose of a more direct application of the wind upon the float The proportions above given may be varied, as the power wanted may be greater or less — But in all cases where the situation of the place is elevated, having no hills in any direction higher, the stationary part, need not be more than ten or fifteen feet high, For a more particular description reference is made to the model in the Patent office and the annexed drawings. —

Witnesses

[illegible] Alder

Harry H. [illegible]

Sol. Wilbur 770 w 87

[illegible]

Drawing